(12) United States Patent
Sundaralingam et al.

(10) Patent No.: US 7,505,864 B2
(45) Date of Patent: Mar. 17, 2009

(54) SPEED DETECTION METHOD IN COMMUNICATION SYSTEM, RECEIVER, NETWORK ELEMENT AND PROCESSOR

(75) Inventors: Sathiaseelan Sundaralingam, Surrey (GB); Khairul Hasan, Surrey (GB); Eric Jones, Hants (GB); Mikko Säily, Sipoo (FI)

(73) Assignee: Nokia Corporation, Espoo (FI)

( * ) Notice: Subject to any disclaimer, the term of this patent is extended or adjusted under 35 U.S.C. 154(b) by 452 days.

(21) Appl. No.: 11/448,760

(22) Filed: Jun. 8, 2006

(65) Prior Publication Data
US 2007/0046527 A1 Mar. 1, 2007

(30) Foreign Application Priority Data
Jul. 4, 2005 (FI) .................................. 20050713

(51) Int. Cl.
*G01P 5/00* (2006.01)
(52) U.S. Cl. ....................... 702/142; 455/441
(58) Field of Classification Search ................ 702/142, 702/144; 375/148, 346, 349; 455/67.11, 455/238.1, 441; 342/450, 461; 324/160, 324/166, 76.55, 76.56
See application file for complete search history.

(56) References Cited

U.S. PATENT DOCUMENTS 6,879,920 B2 * 4/2005 Peng ............................ 702/96
7,299,010 B2 * 11/2007 Lee et al. ...................... 455/62

* cited by examiner

*Primary Examiner*—Tung S Lau
*Assistant Examiner*—Stephen J Cherry
(74) *Attorney, Agent, or Firm*—Squire, Sanders & Dempsey, L.L.P.

(57) ABSTRACT

The embodiment of the invention is related to a processor configured for determining a predetermined number of frequency estimates, determining an average of the frequency estimates for obtaining an averaged frequency offset, unbiasing received samples and/or impulse response values using the averaged frequency offset, calculating Doppler frequency estimates using the unbiased received samples and/or impulse response values and calculating selected second order statistics of the Doppler frequency estimates over a predetermined period and calculating a speed of a communication system terminal using the Doppler frequency.

29 Claims, 2 Drawing Sheets

Figure 1:
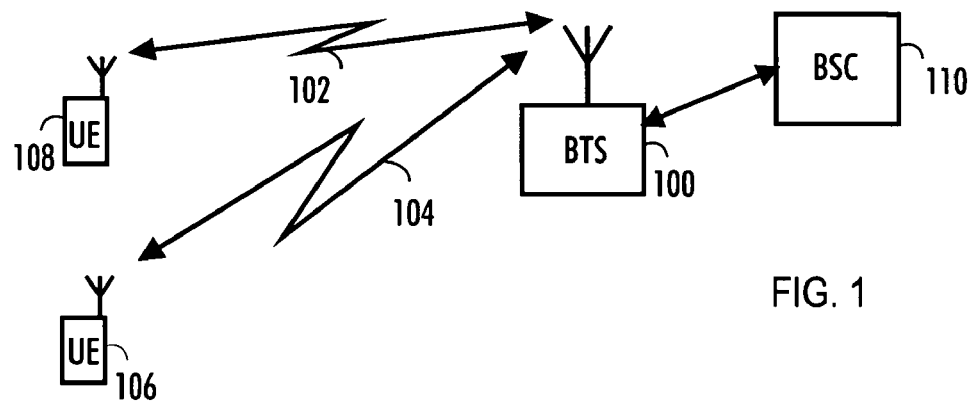

SPEED DETECTION METHOD IN COMMUNICATION SYSTEM, RECEIVER, NETWORK ELEMENT AND PROCESSOR

FIELD

The invention relates to a speed detection method in a communication system, a receiver, a network element and a processor.

BACKGROUND

Ability to estimate the speed of a communication system terminal, such as a user terminal, is needed in increasing the capacity of a wireless system through improving the performance of a handover process, power control and/or channel assignment. For example, it is beneficial to choose for a high-speed user terminal a macro-cell instead of a micro-cell so as to reduce the number of handovers. Moreover, with the knowledge of the user terminal speed, the power control could be optimised, for example by choosing the averaging period of a power control algorithm according to the speed. Briefly, reliable estimates of the speed or, equivalently, the perceived channel Doppler spread, are of great importance in wireless systems.

A prior art method for estimating the speed is based on an average received power crossing rate. The algorithm is based on the comparison of signal level values and their averaged values. The algorithm calculates the rate with which a signal level crosses the averaged signal level due to fast fading. The crossing rate is proportional to the mobile speed.

Several problems arise from the prior art method. Firstly, the method is not suitable to be used with frequency hopping, since different frequencies have different fading characteristics. Secondly, the method fails to provide correct estimates when the speed is too high. This is due to the use of power crossing rate: when the power crossing rate exceeds the used sampling rate, the estimated speed values do not follow actual speeds anymore.

BRIEF DESCRIPTION OF THE INVENTION

According to an aspect of the invention, there is provided a speed detection method in a communication system, the method comprising: determining a predetermined number of frequency estimates; determining an average of the frequency estimates for obtaining an averaged frequency offset; unbiasing received samples and/or impulse response values using the averaged frequency offset; calculating Doppler frequency estimates using the unbiased received samples and/or impulse response values; calculating selected second order statistics of the Doppler frequency estimates over a predetermined period; estimating a maximum Doppler frequency on the basis of the second order statistics; calculating speed of a communication system terminal using the maximum Doppler frequency.

According to another aspect of the invention, there is provided a receiver comprising: means for determining a predetermined number of frequency estimates; means for determining an average of the frequency estimates for obtaining an averaged frequency offset; means for unbiasing received samples and/or impulse response values using the averaged frequency offset; means for calculating Doppler frequency estimates using the unbiased received samples and/or impulse response values; means for calculating selected second order statistics of the Doppler frequency estimates over a predetermined period, means for estimating a maximum Doppler frequency on the basis of the second order statistics, means for calculating speed of a communication system terminal using the maximum Doppler frequency.

According to another aspect of the invention, there is provided a network element, comprising: means for determining a predetermined number of frequency estimates, means for determining an average of the frequency estimates for obtaining an averaged frequency offset, means for unbiasing received samples and/or impulse response values using the averaged frequency offset, means for calculating Doppler frequency estimates using the unbiased received samples and/or impulse response values, means for calculating selected second order statistics of the Doppler frequency estimates over a predetermined period, means for estimating a maximum Doppler frequency on the basis of the second order statistics, means for calculating speed of a communication system terminal using the maximum Doppler frequency.

According to another aspect of the invention, there is provided a processor, comprising: means for determining a predetermined number of frequency estimates, means for determining an average of the frequency estimates for obtaining an averaged frequency offset, means for unbiasing received samples and/or impulse response values using the averaged frequency offset, means for calculating Doppler frequency estimates using the unbiased received samples and/or impulse response values, means for calculating selected second order statistics of the Doppler frequency estimates over a predetermined period, means for estimating a maximum Doppler frequency on the basis of the second order statistics, means for calculating speed of a communication system terminal using the maximum Doppler frequency.

According to another aspect of the invention, there is provided a receiver, being configured to: determine a predetermined number of frequency estimates; determine an average of the frequency estimates for obtaining an averaged frequency offset; unbias received samples and/or impulse response values using the averaged frequency offset; calculate Doppler frequency estimates using the unbiased received samples and/or impulse response values; calculate a selected second order statistics of the Doppler frequency estimates over a predetermined period; estimate a maximum Doppler frequency on the basis of the second order statistics; calculate speed of a communication system terminal using the maximum Doppler frequency.

According to another aspect of the invention, there is provided a processor, being configured to: determine a predetermined number of frequency estimates; determine an average of the frequency estimates for obtaining an averaged frequency offset; unbias received samples and/or impulse response values using the averaged frequency offset; calculate Doppler frequency estimates using the unbiased received samples and/or impulse response values; calculate selected second order statistics of the Doppler frequency estimates over a predetermined period; estimate a maximum Doppler frequency on the basis of the second order statistics; calculate speed of a communication system terminal using the maximum Doppler frequency.

According to another aspect of the invention, there is provided a network element, being configured to: determine a predetermined number of frequency estimates; determine an average of the frequency estimates for obtaining an averaged frequency offset; unbias received samples and/or impulse response values using the averaged frequency offset; calculate Doppler frequency estimates using the unbiased received samples and/or impulse response values; calculate selected second order statistics of the Doppler frequency estimates over a predetermined period; estimate a maximum Doppler frequency on the basis of the second order statistics; calculate speed of a communication system terminal using the maximum Doppler frequency.

The invention provides several advantages. An embodiment of the invention does not depend on a sampling rate and therefore the embodiment is also suitable for high speeds. The embodiment is also well suited for frequency hopping systems.

LIST OF DRAWINGS

Figure 3:
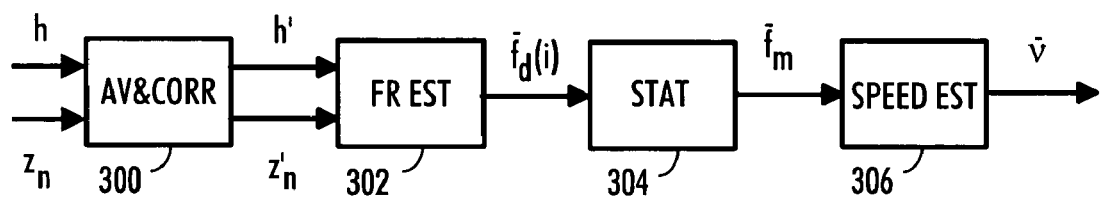
Figure 4:
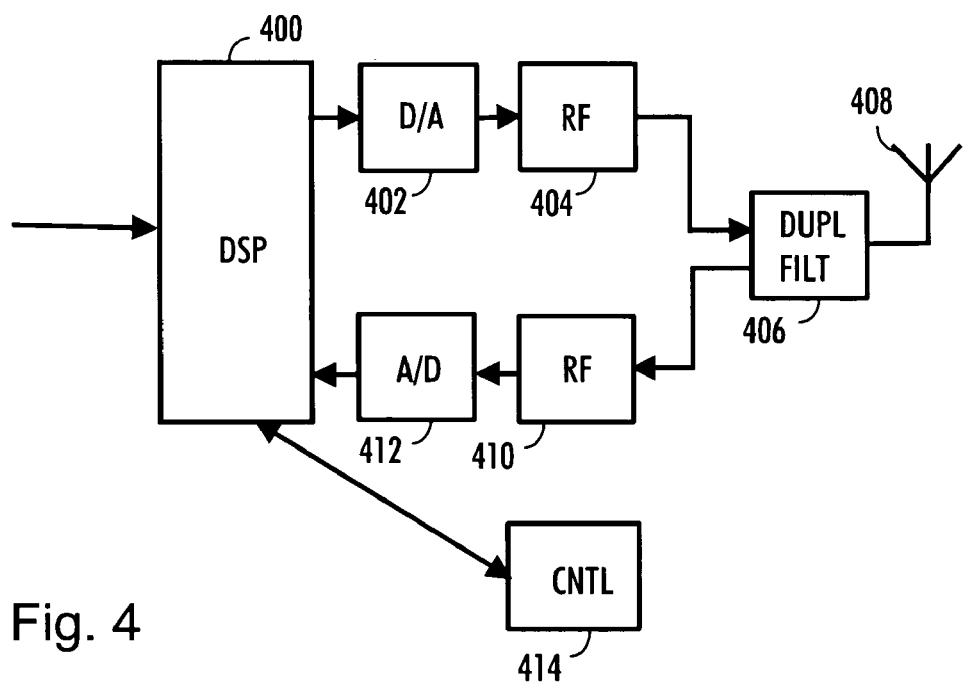
Figure 2:
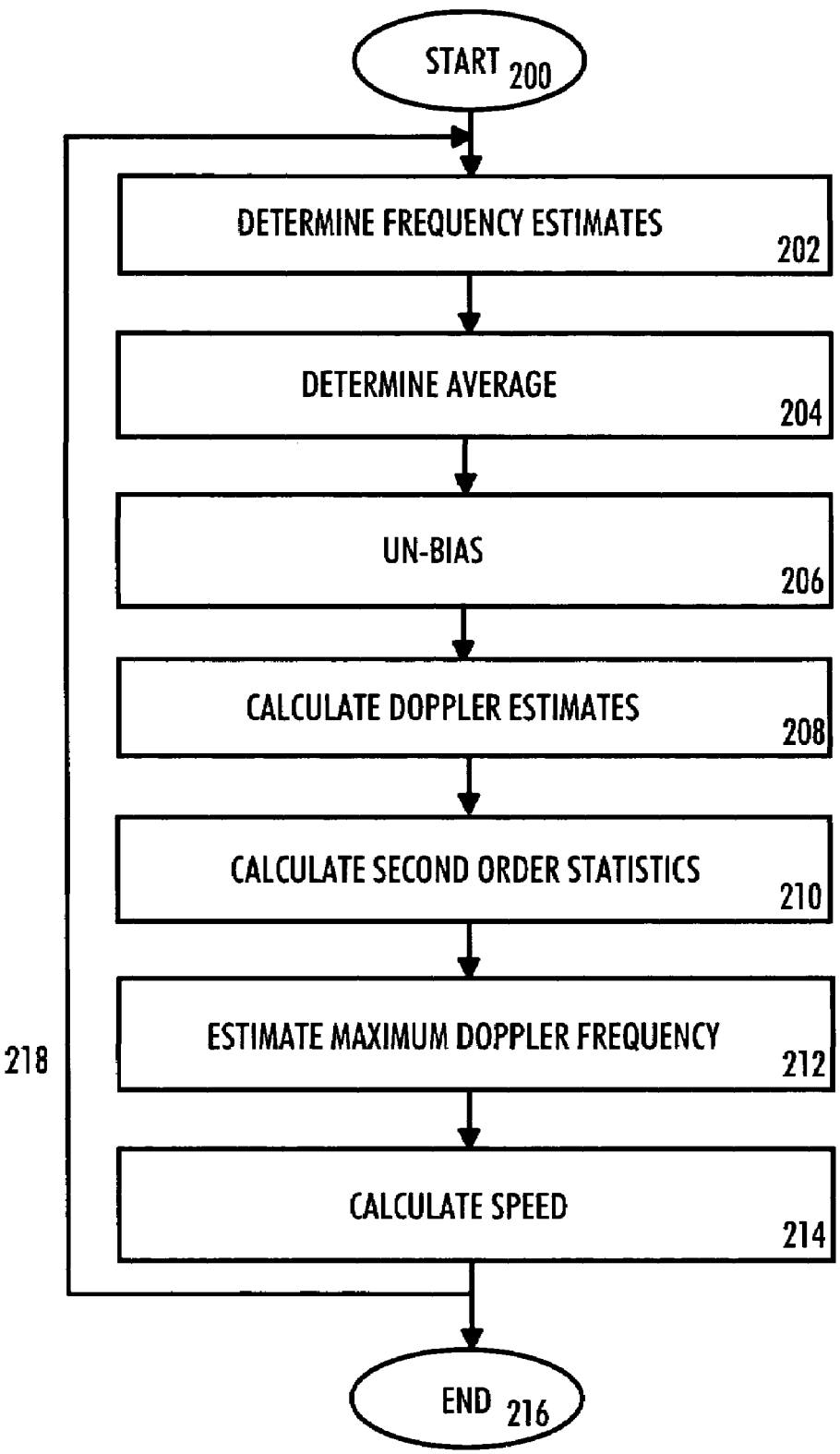

In the following, the invention will be described in greater detail with reference to the embodiments and the accompanying drawings, in which FIG. 1 shows an example of a communication system;
FIG. 2 is a flow chart,
FIG. 3 illustrates an example of a part of a receiver, and
FIG. 4 illustrates an example of a part of a network element.

DESCRIPTION OF EMBODIMENTS

With reference to FIG. 1, we examine an example of a communication system whereto embodiments of the invention can be applied. The present invention can be applied to various communication systems. An example of such a communication system is GSM (Global System for Mobile Communications) or EDGE (enhanced data rates for global evolution). The embodiments are not, however, restricted to the systems given as examples, but a person skilled in the art may apply the solution to other systems provided with the necessary properties.

It is clear to a person skilled in the art that the method according to the invention can be applied to systems utilizing different modulation methods or air interface standards.

FIG. 1 is a simplified illustration of a digital data transmission system to which the solution according to the invention is applicable. This is a part of a cellular radio system, which comprises base station 100, which has bi-directional radio links 102 and 104 to user terminals 106 and 108. The user terminals may be fixed, vehicle-mounted or portable. The base station includes transceivers, for instance. From the transceivers of the base station there is a connection to an antenna unit, which establishes the bidirectional radio links to a user terminal. The base station is further connected to base station controller (BSC) 110, which transmits the connections of the terminals to other parts of the network. The base station controller is further connected to a core network (CN, not shown). Depending on the system, the counterpart on the CN side can be a mobile services switching centre (MSC), a media gateway (MGW) or a serving GPRS (general packet radio service) support node (SGSN).

The cellular radio system can also communicate with other networks, such as a public switched telephone network or the Internet.

In the following, the Doppler effect is explained in further detail.

Whenever relative motion exists between a transmitter and a receiver, there is an apparent shift in the frequency of the received signal due to the Doppler effect. Additionally, when either the transmitter or the receiver is in motion, there is a so-called dynamic multi-path situation in which there is a continuous change in the electrical length of every propagation path and thus the relative phase shifts between them change as a function of a spatial location. The received amplitude (envelope) of the signal varies. At some positions there is constructive addition whilst at others there is almost complete cancellation. In practice, there are of course several different paths which combine in different ways depending on a location.

The time variations, or dynamic changes in the propagation path lengths, can be related directly to the motion of the receiver and indirectly to the Doppler effects that arise. The rate of change of phase, due to motion, is apparent as a Doppler frequency shift in each propagation path.

The phase change is therefore $$\Delta\phi = -\frac{2\pi}{\lambda}\Delta l, \qquad (1)$$

wherein
$\lambda$ is a wave length, and
$\Delta l$ is an incremental change in the path length of the wave $d\cos\alpha$.

The apparent change in frequency (the Doppler shift) is $$f = -\frac{1}{2\pi}\frac{\Delta\phi}{\Delta t} = \frac{v}{\lambda}\cos\alpha = \frac{vf_c}{c}\cos\alpha, \qquad (2)$$

wherein
$\Delta\phi$ is a phase change,
$\Delta t$ is an incremental change of time,
v=velocity or speed,
$\lambda$ is a wavelength,
$\alpha$ is an angle of velocity related to the base station,
$f_c$ is a carrier frequency, and
c is speed of light, $3*10^8$ m/s.

It is clear that the change in path length is depending on the spatial angle between the wave and the direction of motion. The maximum Doppler shift can be expressed as follows:

$$f_m = \frac{vf_c}{c}, \qquad (3)$$

wherein
v is the speed of a user terminal,
$f_c$ is a carrier frequency, and
c is speed of light, $3*10^8$ m/s.

Next, an embodiment of the speed estimation method is explained by means of FIG. 2. The embodiment is well suited for estimating the speed of a user terminal of a communication system, such as mobile equipment, when at a high speed. In the embodiment, the speed estimation process is carried out over a selected period, for example a burst. The method utilises previously determined signal samples, impulse response values or filter tap values. There are several prior art methods to sample a signal, to determine impulse response values or filter tap values. Therefore the methods are not explained here in further detail.

The embodiment starts in block 200.

In block 202, a predetermined number of frequency estimates are determined. One possible method for estimating frequency in a GSM/EDGE system (GSM=Global System for Mobile Communications, EDGE=enhanced data rates for global evolution or enhanced data rates for GSM evolution) is based on using received and reference values. The method employs a Least Square Error (LSE) criterion on received and reference symbols obtained from 26 training symbols and 5 channel impulse response values estimated by a least square estimator. The least square estimator provides unbiased frequency estimates (i.e. it doe not introduce a mean component).

The frequency is estimated by using the following equation:

$$\hat{\omega}_{lse} = -\frac{\sum_{n=64}^{87} r_n \text{Im}\{a_n^* z_n\}}{\sum_{n=64}^{87} r_n^2 |a_n|^2}, \quad (4)$$

wherein $z_n$ are received samples, $r_n \equiv (n-N/2)$ are constants,

Im denotes an imaginary value, $\Sigma$ denotes a summing operation, n denotes the current received symbol, and $\alpha_n$ denotes the reference values that are obtained $$a_n = \sum_{k=0}^{L} h_k s_{n-k}, \quad (5)$$

$$n = 64 \ldots 87,$$

wherein $h_k$ represents the current channel impulse response value, $s_{n-k}$ represents the transmitted training symbols, $\Sigma$ denotes a summing operation, and L represents the number of channel impulse response values.

In block 204, an average of the frequency estimates is determined. The average can be determined by calculating a running average as follows:

$$\overline{\omega}_k = \overline{\omega}_{k-1} + \mu \omega_{k-1} \quad (6)$$

wherein $\overline{\omega}_{k-1}$ represents the previous frequency estimate average (calculated, for instance, for the previous burst), $\omega_k$ represents the frequency estimate over a selected period (for instance a burst), k is the period number and $\mu$ is an adaptive constant. The constant $\mu$ can be set between 0.008-0.04 to obtain a smooth average, but it can be set to a higher value if a fast adaptation is needed.

There are also other methods to calculate the average.

In block 206, predetermined received samples and/or impulse response values are unbiased using the averaged frequency offset.

The unbiasing is performed for removing the average frequency component. The unbiasing can be done for received samples as follows:

$$z'_n = z_n e^{-j 2\pi \overline{f}_k (n-M/2)}, n = \{0, 1, \ldots M-1\}, \quad (7)$$

wherein $z_n$ represents the received samples before unbiasing,

M is the period length (for instance a burst length), j denotes a complex value, and $\overline{f}_k$ is obtained from equation (6) ($\omega = 2\pi f$).

The unbiasing can be done for the impulse response values (or filter taps) using the following equation:

$$h'_i = h_i e^{-j 2\pi \overline{f}_k (i-L/2)}, i = \{0, 1, \ldots L-1\}, \quad (8)$$

wherein $h_i$ represents the filter taps or impulse response values before unbiasing, L denotes the number of filter taps or impulse response values, j denotes a complex value, and $\overline{f}_k$ is obtained from equation (6) ($\omega = 2\pi f$).

In block, 208, Doppler frequency estimates are calculated using the unbiased received samples and/or impulse response values. The Doppler frequency estimates can be calculated as follows:

$$\hat{\omega}_{lmmse} = -\frac{\sum_{n=64}^{87} r_n \text{Im}\{a'^*_n z'_n\}}{\sum_{n=64}^{87} r_n^2 |a'_n|^2 + \frac{\sigma_w^2}{\sigma_\omega^2}}, \quad (9)$$

wherein $z'_n$ are the modified received samples (mean/average frequency offset removed), $r_n \equiv (n-N/2)$ are constants, $\sigma_w^2$ is an estimated noise variance, $\sigma_\omega^2$ is the variance of the frequency offset, $\Sigma$ denotes a summing operation, Im denotes an imaginary value, n denotes the current received symbol, $a'^*_n$ represents complex conjugate of reference values obtained after average removal $a'_n$ represents reference values obtained after average removal which may be calculated by using the following equation:

$$a'_n = \sum_{k=0}^{L} h'_k s_{n-k}, \quad (10)$$

wherein $h'_k$ represents the channel impulse response value after average removal (unbiasing), $s_{n-k}$ denotes the transmitted training symbols, $\Sigma$ denotes a summing operation, and L represents the number of channel impulse response values.

In block 210, selected second order statistics of the Doppler frequency estimates is calculated over a predetermined period. In practise, due to unreliability of the estimator, the maximum Doppler shift cannot be obtained by selecting the highest value from the observations but the observations will be handled statistically. There are several possible second order statistics that may be used. In this example, a standard deviation is used. The standard deviation can be calculated:

$$f_{std} = \sqrt{\frac{1}{N} \sum_{k=0}^{N-1} |f_k - \overline{f}_k|^2}, \quad (11)$$

wherein

N is the number of periods, $f_k$ represents the frequency estimate over a selected period (for instance a burst), $\overline{f}_k$ denotes an average of the frequency estimates and it is obtained from equation (6) ($\omega = 2\pi f$), Σ denotes a summing operation,
√ denotes square root, and
k is the period number.
Equation (11) may also be written:

$$f_{std} = \sqrt{\frac{1}{N}\sum_{k=0}^{N-1}|f_d(i)|^2}, \quad (12)$$

wherein
$f_d(i)$ denotes the Doppler shift estimate after unbiasing,
N is the number of periods (or bursts),
√ denotes square root, and
Σ denotes a summing operation.

In block 212, a maximum Doppler frequency is estimated on the basis of the second order statistics. The maximum Doppler frequency can be obtained from the following equation:

$$f_m = \sqrt{-2f_{std}^2 \ln(\alpha)}, \quad (13)$$

wherein
$f_{std}$ is obtained from equation (12),
√ denotes a square root, and
α means a confident interval or the optimum probability that can capture the maximum Doppler shift from the frequency distribution. Variable α may be chosen with the aid of simulations, and
ln( ) means a Napierian logarithm.

In block 214, speed of a communication system terminal is calculated using the maximum Doppler frequency estimate. The speed estimate of a communication system terminal, such as a mobile, can be obtained by using the definition of a maximum Doppler shift:

$$f_m = \frac{vf_c}{c}, \quad (3)$$

wherein
v is the speed of a user terminal,
$f_c$ is a carrier frequency, and
c is speed of light, $3*10^8$ m/s.

The speed estimate $\hat{v}$ can therefore be obtained by using equation:

$$\hat{v} = \frac{c\hat{f}_m}{f_c}, \quad (14)$$

wherein
$f_c$ is a carrier frequency, and
c is speed of light, $3*10^8$ m/s, and
$\hat{f}_m$ is obtained from equation (13).

The embodiment ends in block 216. The arrow 218 depicts one possibility for repeating the embodiment.

An example of a part of a receiver (typically implemented by a processor or a part of it) is shown in FIG. 3. The part of a receiver is typically placed in a network element such as a base station.

Input values to block 300 are the received signal samples and/or the previously determined impulse response values and/or the filter tap values. There are several prior art methods to sample a signal, to determine impulse response values or filter tap values. Therefore the methods are not explained here in further detail.

First, frequency estimates are determined by using, for example, equation (4), then they are averaged in block 300 by using, for example, equation (6). Frequency estimates or impulse response values are unbiased using the determined average. The unbiasing is performed for removing the average frequency component. The unbiasing can be performed by using equation (7) and/or (8).

Doppler shift after unbiasing, $f_d(i)$, is performed in block 302 by using, for instance, equation $f_k - \bar{f}_k$, wherein $f_k$ represents the frequency estimate over a selected period (for instance a burst) and $\bar{f}_k$ represents an average of the frequency estimates and it is obtained from equation (6) ($\omega = 2\pi f$).

In block 304, selected second order statistics of the Doppler frequency estimates is calculated. The maximum Doppler frequency is estimated in block 304 using the second order statistics (for example variance or standard deviation). The maximum Doppler frequency can be obtained by using equation (13).

Speed estimation is performed in block 306 by using, for instance, equation (14).

The receiver may also comprise other parts than those shown in FIG. 3.

FIG. 4 shows an example of a part of a base station. The base station is an example of a network element. The transceiver uses the same antenna 408 for receiving and transmitting and therefore there is also a duplex filter 406 to separate transmission and reception. The antenna may be an antenna array or a single antenna.

Receiver RF-parts 410, in this case, comprise also a power amplifier that amplifies the received signal attenuated on a radio path. Typically RF-parts down-convert a signal to an intermediate frequency and then to a base band frequency or straight to base band frequency. The analogue-to-digital converter 412 converts an analogue signal to digital form by sampling and quantizing.

A receiver and a transmitter typically share Digital Signal Processing block 400. There could be separate DSP-blocks for both, too. Typical functions of a DSP block are for example interleaving, coding and ciphering for transmission and corresponding removal functions for reception such as deinterleaving, decoding etc. Digital Signal Processing is known in the art.

In a transmitter, block 402 converts the signal into an analogue form. RF-parts in block 404 up-convert the signal to a carrier frequency, in other words a radio frequency either via an intermediate frequency or straight to the carrier frequency. In this example, RF-parts also comprise a power amplifier which amplifies the signal for a radio path.

Control block 414 controls DSP block 400. The control block may also be included into the DSP block.

The transceiver may also comprise other parts than those shown in FIG. 4.

The disclosed functionalities of the described embodiments of the speed detection method can be advantageously implemented by means of software which is typically located in a Digital Signal Processor. The implementation solution can also be, for instance, an ASIC (Application Specific Integrated Circuit) component. A hybrid of these different implementations is also feasible. The speed detection method may also be implemented as a module insertable for instance to a network element.

Even though the invention is described above with reference to an example according to the accompanying drawings, it is clear that the invention is not restricted thereto but it can be modified in several ways within the scope of the appended claims.

The invention claimed is:

1. A speed detection method in a communication system, comprising:
   determining a predetermined number of frequency estimates;
   determining an average of the frequency estimates for obtaining an averaged frequency offset;
   unbiasing received samples and/or impulse response values using the averaged frequency offset;
   calculating Doppler frequency estimates using the unbiased received samples and/or the impulse response values;
   calculating selected second order statistics of the Doppler frequency estimates over a predetermined period;
   estimating a maximum Doppler frequency based on the selected second order statistics;
   calculating a speed of a communication system terminal using the maximum Doppler frequency.

2. The method of claim 1, wherein the method is executed over a selected period.

3. The method of claim 1, wherein the method is executed burst-wise.

4. The method of claim 1, further comprising:
   determining the frequency estimates by using equation $$\hat{\omega}_{lse} = -\frac{\sum_{n=64}^{87} r_n \mathrm{Im}\{a_n^* z_n\}}{\sum_{n=64}^{87} r_n |a_n|^2},$$

wherein
$z_n$ are received samples,
$r_n \equiv (n-N/2)$ are constants,
n denotes current received symbols, and
$a_n$ denotes reference values that are obtained from $$a_n = \sum_{k=0}^{L} h_k s_{n-k},$$

$n = 64 \ldots 87,$ wherein
$h_k$ represents a current channel impulse response value,
$s_{n-k}$ represents transmitted training symbols, and
L represents a number of channel impulse response values.

5. The method of claim 1, further comprising:
   determining the average of the frequency estimates by using equation $$\overline{\omega}_k = \overline{\omega}_{k-1} + \mu \omega_k,$$

wherein
$\overline{\omega}_{k-1}$ represents a previous frequency estimate average calculated for a previous burst,
$\omega_k$ represents a frequency estimate over a selected period comprising a burst,
k is a period number, and
μ is an adaptive constant, wherein the adaptive constant μ is set between 0.008-0.04 to obtain a smooth average, and is set to a higher value when a fast adaptation is needed.

6. The method of claim 5, further comprising:
   unbiasing predetermined frequency estimates by using equation $$z'_n = z_n e^{-j2\pi \overline{\omega}_k (n-M/2)}, n=\{0,1,\ldots M-1\}$$

wherein
$z_n$ represents the received samples before unbiasing,
M is a period length comprising a burst length, and
j denotes a complex value.

7. The method of claim 5, further comprising:
   unbiasing impulse response values using equation $$h'_i = h_i e^{-j2\pi \overline{\omega}_k (i-L/2)}, i=\{0,1,\ldots L-1\},$$

wherein
$h_i$ represents filter taps or the impulse response values before biasing,
L denotes a number of filter taps or impulse response values, and
j is a complex value.

8. The method of claim 1, further comprising:
   calculating the Doppler frequency estimates by using equation $$\hat{\omega}_{lmmse} = -\frac{\sum_{n=64}^{87} r_n \mathrm{Im}\{a'^*_n z'_n\}}{\sum_{n=64}^{87} r_n^2 |a'_n|^2 + \frac{\sigma_w^2}{\sigma_\omega^2}},$$

wherein
$z'_n$ are modified received samples comprising mean/average frequency offset removed,
$r_n \equiv (n-N/2)$ are constants,
$\sigma_w^2$ is an estimated noise variance,
$\sigma_\omega^2$ is a variance of the frequency offset,
Σ denotes a summing operation,
Im denotes an imaginary value,
n denotes a current received symbol,
$a'^*_n$ represents the complex conjugate of reference values obtained after average removal, and
$a'_n$ represents reference values obtained after an average removal $$a'_n = \sum_{k=0}^{L} h'_k s_{n-k},$$

wherein
$h'_k$ represents a channel impulse response value after mean/average removal,
$s_{n-k}$ denotes a transmitted training symbols, and
L represents a number of channel impulse response values.

9. The method of claim 5, further comprising calculating a selected second order statistics by using equation $$f_{std} = \sqrt{\frac{1}{N} \sum_{k=0}^{N-1} |\omega_k - \overline{\omega}_k|^2},$$

wherein
N is a number of periods,
$\omega_k$ represents the frequency estimate over a selected period comprising a burst), $\overline{\omega}_k$ denotes the average of the frequency estimates, and k is a period number.

10. The method of claim 1, wherein the selected second order statistics being a standard deviation.

11. The method of claim 9, further comprising:

estimating a maximum Doppler frequency by using equation $$\hat{f}_m = \sqrt{-2f_{std}^2 \ln(\alpha)},$$

wherein

α is a confident interval or an optimum probability that captures the maximum Doppler shift from a frequency distribution, wherein α is chosen using simulations.

12. The method of claim 11, further comprising:

calculating the speed of a communication system terminal by using equation $$\hat{v} = \frac{c\hat{f}_m}{f_c},$$

wherein $f_c$ is a carrier frequency, and c is speed of light, $3*10^8$ m/s.

13. A receiver comprising:

means for determining a predetermined number of frequency estimates;

means for determining an average of the frequency estimates for obtaining an averaged frequency offset;

means for unbiasing received samples and/or impulse response values using the averaged frequency offset;

means for calculating Doppler frequency estimates using the unbiased received samples and/or the impulse response values;

means for calculating a selected second order statistics of the Doppler frequency estimates over a predetermined period;

means for estimating a maximum Doppler frequency based on the selected second order statistics;

means for calculating a speed of a communication system terminal using the maximum Doppler frequency.

14. The receiver of claim 13, further comprising:

means for executing the speed calculation over a selected period.

15. The receiver of claim 13, further comprising:

means for executing the speed calculation burst-wise.

16. The receiver of claim 13, further comprising:

means for determining frequency estimates by using equation $$\hat{\omega}_{lse} = -\frac{\sum_{n=64}^{87} r_n \text{Im}\{a_n^* z_n\}}{\sum_{n=64}^{87} r_n |a_n|^2},$$

wherein $z_n$ are received samples, $r_n \equiv (n-N/2)$ are constants, n denotes current received symbols, and $a_n$ represents reference values that are obtained $$a_n = \sum_{k=0}^{L} h_k s_{n-k},$$

$n = 64 \ldots 87,$ wherein $h_k$ represents a current channel impulse response value, $s_{n-k}$ denotes a transmitted training symbols, and L represents a number of channel impulse response values.

17. The receiver of claim 13, further comprising:

means for determining the average of the frequency estimates by using equation $$\overline{\omega}_k = \overline{\omega}_{k-1} + \mu \omega_k,$$

wherein $\overline{\omega}_{k-1}$ represents a previous frequency estimate average calculated for a previous burst, $\omega_k$ represents a frequency estimate over a selected period comprising a burst, k is a period number and μ is an adaptive constant, wherein the adaptive constant μ is set between 0.008-0.04 to obtain a smooth average, and is set to a higher value when a fast adaptation is needed.

18. The receiver of claim 13, further comprising:

means for unbiasing predetermined frequency estimates by using equation $$z'_n = z_n e^{-j2\pi\overline{\omega}_k(n-M/2)}, n=\{0,1,\ldots M-1\},$$

wherein $z_n$ represents the received samples before unbiasing,

M is a period length comprising a burst length, and j denotes a complex value.

19. The receiver of claim 13, further comprising:

means for unbiasing impulse response values using equation $$h'_i = h_i e^{-j2\pi\overline{\omega}_k(i-L/2)}, i=\{0,1,\ldots L-1\}$$

wherein $h_i$ represents filter taps or the impulse response values before biasing, L denotes a number of filter taps or impulse response values, and j denotes a complex value.

20. The receiver of claim 13, further comprising:

means for calculating the Doppler frequency estimates by using equation $$\hat{\omega}_{lmmse} = -\frac{\sum_{n=64}^{87} r_n \text{Im}\{a'^*_n z'_n\}}{\sum_{n=64}^{87} r_n^2 |a'_n|^2 + \frac{\sigma_w^2}{\sigma_\omega^2}},$$

wherein $z'_n$ are the modified received samples comprising mean/average frequency offset removed, $r_n \equiv (n-N/2)$ are constants, $\sigma_w^2$ is an estimated noise variance, $\sigma_\omega^2$ is a variance of the frequency offset, Σ denotes a summing operation, Im denotes an imaginary value, n denotes a current received symbol,
a'*$_n$ represents a complex conjugate of reference values obtained after an average removal, and
a'$_n$ represents reference values obtained after average removal $$a'_n = \sum_{k=0}^{L} h'_k s_{n-k},$$

wherein
h'$_k$ represents a channel impulse response value after mean/average removal,
s$_{n-k}$ denotes a transmitted training symbols, and
L represents a number of channel impulse response values.

21. The receiver of claim 17, further comprising:
means for calculating a selected second order statistics by using equation $$f_{std} = \sqrt{\frac{1}{N}\sum_{k=0}^{N-1}|\omega_k - \overline{\omega}_k|^2},$$

wherein
N is a number of periods,
$\omega_k$ represents the frequency estimate over a selected period comprising a burst),
$\overline{\omega}_k$ denotes the average of the frequency estimates, and
k is a period number.

22. The receiver of claim 13, further comprising means for calculating standard deviation as a second order statistics.

23. The receiver of claim 21, further comprising:
means for estimating a maximum Doppler frequency by using equation $$f_m = \sqrt{-2f_{std}^2 \ln(\alpha)},$$

wherein
α denotes a confident interval or an optimum probability that captures the maximum Doppler shift from a frequency distribution, wherein α is chosen using simulations.

24. The receiver of claim 23, further comprising:
means for calculating the speed of a communication system terminal by using equation $$\hat{v} = \frac{c\hat{f}_m}{f_c},$$

wherein
f$_c$ is a carrier frequency, and
c is speed of light, 3*10$^8$ m/s.

25. A network element comprising:
means for determining a predetermined number of frequency estimates;
means for determining an average of the frequency estimates for obtaining an averaged frequency offset;
means for unbiasing received samples and/or the impulse response values using the averaged frequency offset;
means for calculating Doppler frequency estimates using the unbiased received samples and/or impulse response values;
means for calculating selected second order statistics of the Doppler frequency estimates over a predetermined period;
means for estimating a maximum Doppler frequency based on the selected second order statistics;
means for calculating a speed of a communication system terminal using the maximum Doppler frequency.

26. A processor comprising:
means for determining a predetermined number of frequency estimates;
means for determining an average of the frequency estimates for obtaining an averaged frequency offset;
means for unbiasing received samples and/or impulse response values using the averaged frequency offset;
means for calculating Doppler frequency estimates using the unbiased received samples and/or the impulse response values;
means for calculating selected second order statistics of the Doppler frequency estimates over a predetermined period;
means for estimating a maximum Doppler frequency based on the selected second order statistics;
means for calculating a speed of a communication system terminal using the maximum Doppler frequency.

27. A receiver configured to:
determine a predetermined number of frequency estimates;
determine an average of the frequency estimates for obtaining an averaged frequency offset;
unbias received samples and/or impulse response values using the averaged frequency offset;
calculate Doppler frequency estimates using the unbiased received samples and/or the impulse response values;
calculate a selected second order statistics of the Doppler frequency estimates over a predetermined period;
estimate a maximum Doppler frequency based on the selected second order statistics;
calculate a speed of a communication system terminal using the maximum Doppler frequency.

28. A processor configured to:
determine a predetermined number of frequency estimates;
determine an average of the frequency estimates for obtaining an averaged frequency offset;
unbias received samples and/or impulse response values using the averaged frequency offset;
calculate Doppler frequency estimates using the unbiased received samples and/or the impulse response values;
calculate selected second order statistics of the Doppler frequency estimates over a predetermined period;
estimate a maximum Doppler frequency based on the selected second order statistics;
calculate a speed of a communication system terminal using the maximum Doppler frequency.

29. A network element configured to:
determine a predetermined number of frequency estimates;
determine an average of the frequency estimates for obtaining an averaged frequency offset;
unbias received samples and/or impulse response values using the averaged frequency offset;
calculate Doppler frequency estimates using the unbiased received samples and/or the impulse response values;
calculate selected second order statistics of the Doppler frequency estimates over a predetermined period;
estimate a maximum Doppler frequency based on the selected second order statistics;
calculate a speed of a communication system terminal using the maximum Doppler frequency.

* * * * *